J. WHITE.
Churn.

No. 53,512.  Patented March 27, 1866.

Witnesses:

Inventor:
James White

UNITED STATES PATENT OFFICE.

JAMES WHITE, OF CLEVELAND, OHIO.

IMPROVEMENT IN CHURNS.

Specification forming part of Letters Patent No. 53,512, dated March 27, 1866.

*To all whom it may concern:*

Be it known that I, JAMES WHITE, of Cleveland, in the county of Cuyahoga and State of Ohio, have invented certain new and useful Improvements in Churns; and I do hereby declare that the following is a full and complete description of the construction and operation of the same, reference being had to the accompanying drawings, making a part of this specification, in which—

Figure 1:
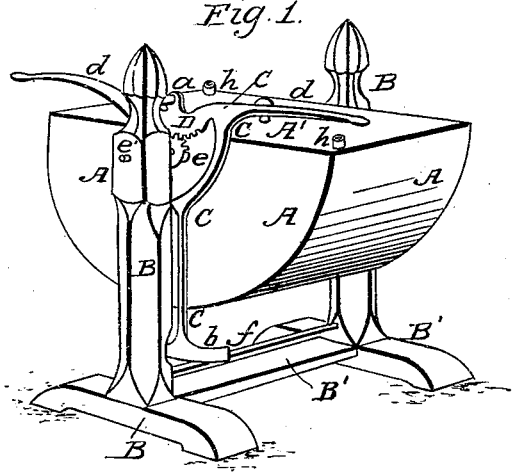
Figure 2:
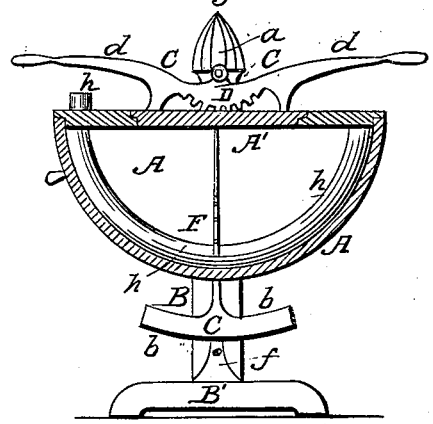
Figure 3:
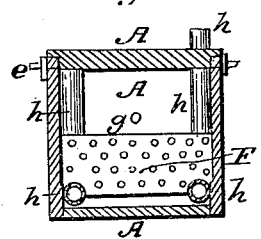

Figure 1 is a perspective view of the churn. Fig. 2 is a vertical longitudinal section. Fig. 3 is a transverse vertical section of the body of the churn.

Like letters of reference refer to like parts in the views.

My improvement relates to the construction and operation of a churn, as hereinafter described.

A represents the body of the churn, that is of a semicircular form, and is hung between standards B extending up from a platform or base, B'. On one side of the churn there is a pendulum, C, formed as shown in Figs. 1 and 2, pivoted at $a$ to one of the standards, underneath which there is a segment, D, of a gear, that works in a section, $e$, of a gear-wheel secured on the shaft or journal of the body of the churn, whereby the churn is rocked or vibrated back and forth.

$d\ d$ are arms or levers extending out on each side, as represented. The pendulum extends down, as shown in Fig. 1, and at the lower end project from each side pieces, $b\ b$, by which the churn can be operated by the foot, if desired.

$f$ is a brace extending between the standards. A' is the lid or cover of the churn that is cut out on the sides, as shown in Fig. 2, so as to fit closely in the top of the churn, and not get out of place when the churn is in motion.

The internal structure of the churn is shown in Figs. 2 and 3. In the middle of the body there is a perforated division, F, that forms the dasher, and round on the inside are metallic tubes or pipes $h$, that project up at one end through the top at opposite corners, as shown in Fig. 1, by which the temperature of the milk can be regulated by pouring into the tubes hot or cold water.

$g$ is an opening or hole in one end, (seen in Fig. 3,) through which the buttermilk or water can be drawn from the churn by tipping it up.

The manner in which this churn as constructed operates is as follows: After the cream or milk is poured into the churn and the cover put on it is rocked or vibrated back and forth, either by the hand-levers $d$ or with the foot being placed on either of the pieces $b$ projecting from the lower end of the pendulum. As the churn is vibrated by the action of the pendulum the milk is thrown around in the churn against the dasher F, churning it in a short time, and the temperature is easily regulated by means of pipes without putting any water in the milk. This churn is very easily operated, the momentum or motion of the milk after it is started aiding in keeping the churn in motion, and it can easily be thoroughly cleansed.

What I claim as my improvement, and desire to secure by Letters Patent, is—

The tubes $h\ h$, dasher F, and case A, in combination with the pendulum C, gearing D $e$, and levers $d$, substantially as and for the purpose set forth.

JAMES WHITE.

Witnesses:
J. A. HOLMES,
A. W. McCLELLAND.